(12) United States Patent
Scholz

(10) Patent No.: US 6,795,054 B1
(45) Date of Patent: Sep. 21, 2004

(54) OPTICAL FILTER MEASUREMENT SYSTEM

(75) Inventor: Robert J. Scholz, Midland (CA)

(73) Assignee: Raytheon Company, Waltham, MA (US)

( * ) Notice: Subject to any disclaimer, the term of this patent is extended or adjusted under 35 U.S.C. 154(b) by 158 days.

(21) Appl. No.: 10/090,066

(22) Filed: Feb. 27, 2002

(51) Int. Cl.[7] .............................................. G01N 21/00
(52) U.S. Cl. ..................................... 345/124; 356/239.2
(58) Field of Search ................................ 356/124–127, 356/239.1–239.2, 237.1

(56) References Cited

U.S. PATENT DOCUMENTS

| | | | |
|---|---|---|---|
| 4,283,139 A | * | 8/1981 | Swope ........................ 356/125 |
| 6,084,716 A | * | 7/2000 | Sanada et al. ............... 359/629 |
| 6,175,645 B1 | * | 1/2001 | Elyasaf et al. ............... 382/147 |
| 6,198,531 B1 | * | 3/2001 | Myrick et al. ............... 356/300 |
| 6,341,187 B1 | * | 1/2002 | Wu et al. ....................... 385/52 |
| 6,636,301 B1 | * | 10/2003 | Kvamme et al. ......... 356/237.2 |

* cited by examiner

*Primary Examiner*—Hoa Q. Pham
(74) *Attorney, Agent, or Firm*—William C. Schubert; Glenn H. Lenzen, Jr.

(57) ABSTRACT

An optical component measurement system including a holding fixture adapted to hold a plurality of optical components in an array; and an optical detector movably connected to the holding fixture. The detector is movable between a front side of the holding fixture and an opposite rear side of the holding fixture for taking measurements from more than one side of the optical components in the array.

16 Claims, 9 Drawing Sheets

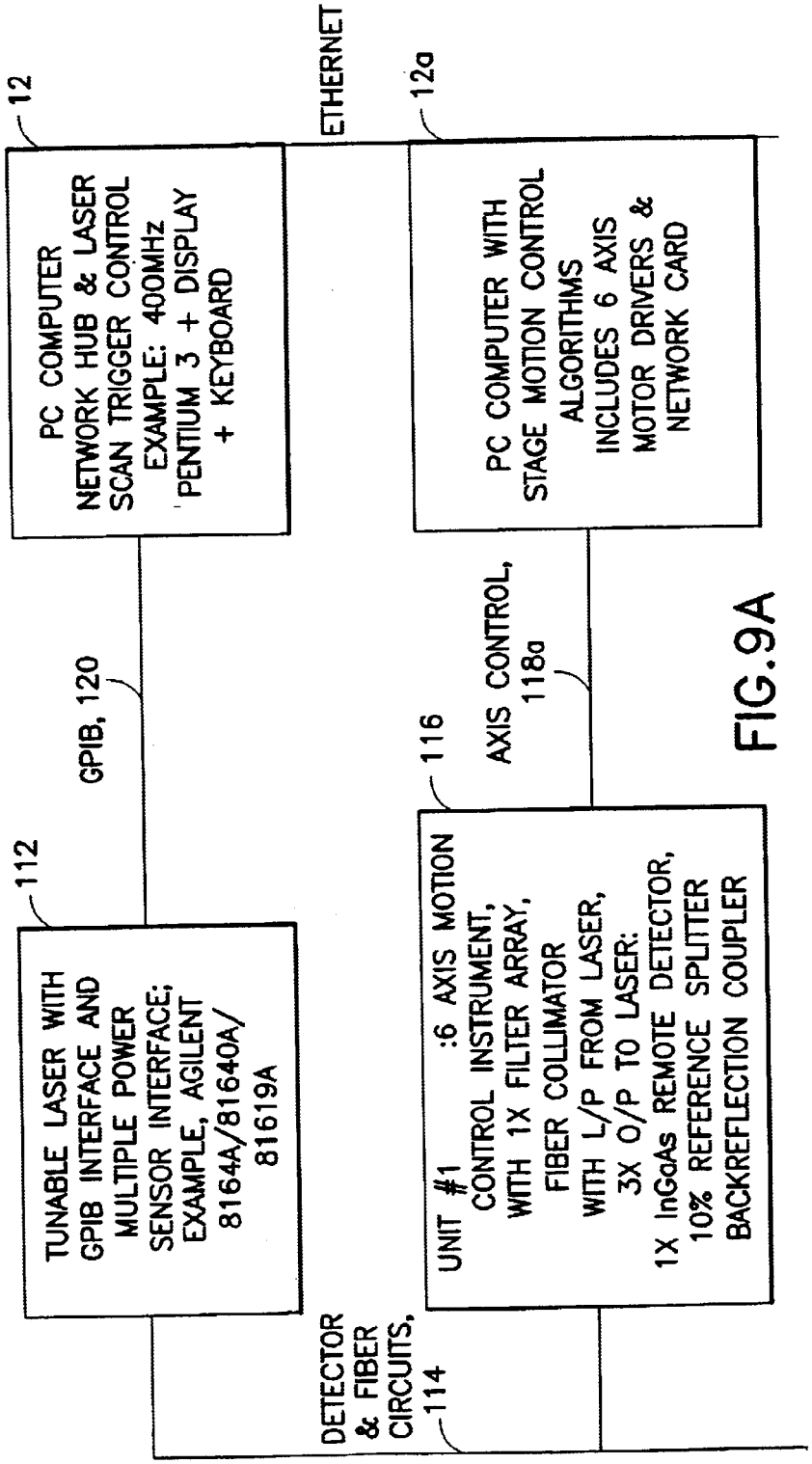

OPTICAL FILTER MEASUREMENT SYSTEM

BACKGROUND OF THE INVENTION

1. Field of the Invention

The present invention relates to optical components and, more particularly, to a system for measuring optical characteristics of optical components.

2. Prior Art

Measurements of optical filters for telecommunications applications are usually described as being done as a single operation or as a series of actions or experiments in a laboratory environment using such devices such as OSAs, tunable lasers, fiber collimators, and detectors. Such devices can be configured for volume production measurements usually with a pick and place robot for handling of parts. However, the majority of users perform manual handling and control of the measurement function. Production robotic devices are currently offered, such as a Veeco AFTS. The limitation of most devices is that they measure only in a transmission at normal incidence; and only some being capable of non-normal incidence measurement. However, in the case of CADM or multiplexer (MUX) applications, it is necessary to have volume capability for both transmission and reflection measurements at various incidence angles and reflection angles.

SUMMARY OF THE INVENTION

In accordance with one aspect of the present invention, an optical component measurement system is provided including a holding fixture adapted to hold a plurality of optical components in an array; and an optical detector movably connected to the holding fixture. The detector is movable between a front side of the holding fixture and an opposite rear side of the holding fixture for taking measurements from more than one side of the optical components in the array.

In accordance with another aspect of the present invention, an optical filter measurement holding fixture is provided comprising a frame comprising receiving areas sized and shaped to receive portions of optical filters in an array; and crisscrossing flexible line shaped spacers located on the frame. The flexible line shaped spacers are adapted to be located between adjacent optical filters located in the receiving areas to position the adjacent optical filters.

In accordance with one method of the present invention, a method of measuring an optical filter is provided comprising steps of mounting the optical filter in a holding fixture for holding an array of optical filters; connecting the holding fixture to a measuring device between an optical emitter and an optical detector; measuring optical transmission through the optical filter; and moving the optical detector to an opposite side of the holding fixture to measure reflection of the optical filter.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
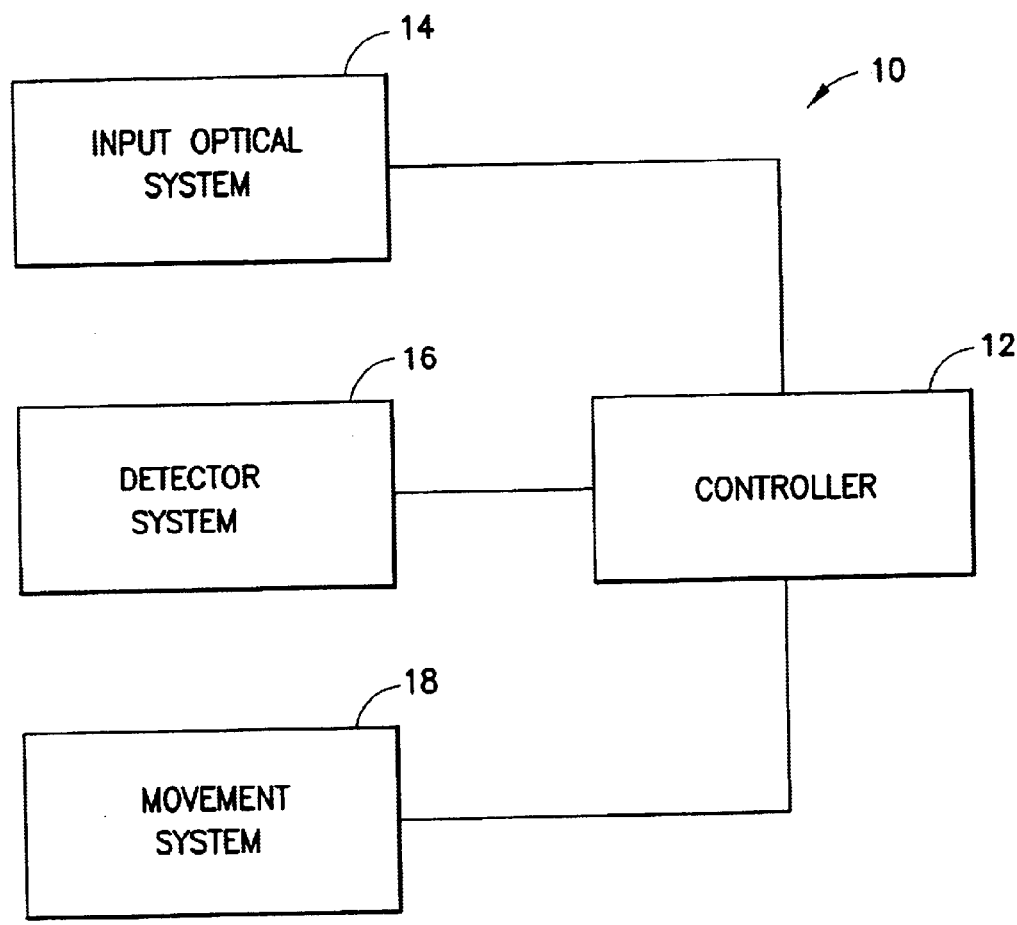
FIG. 1 is a block diagram of a system incorporating features of the present invention.

Referring to FIG. 1, there is shown a block diagram of an optical component measurement system 10 incorporating features of the present invention. Although the present invention will be described with reference to the embodiments shown in the drawings, it should be understood that the present invention can be embodied in many alternate forms of embodiments. In addition, any suitable size, shape or type of elements or materials could be used.

Figure 2:
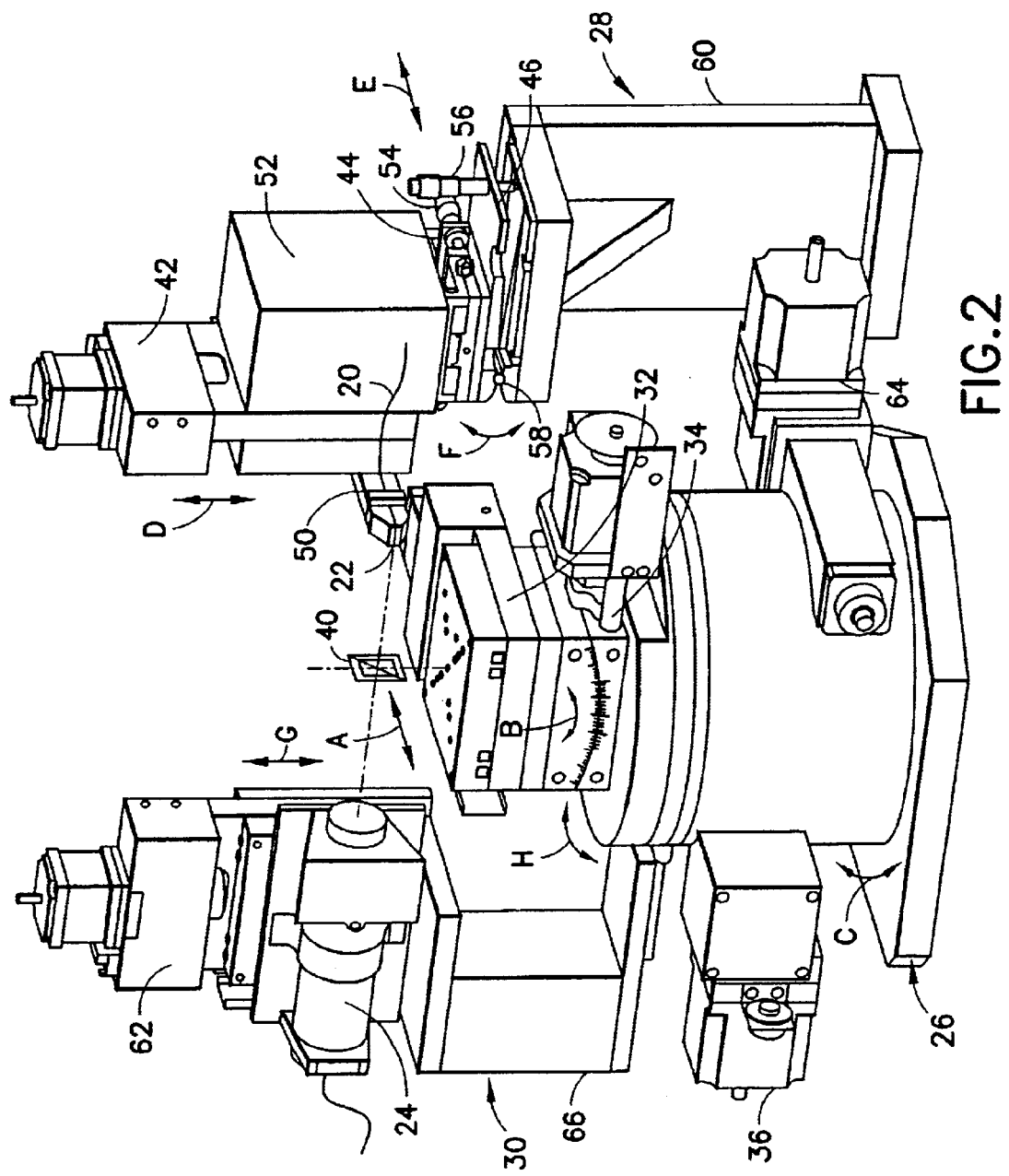
FIG. 2 is a perspective view of portions of the system shown in FIG. 1.

The system 10 generally comprises a controller 12, an input optical system 14, a detector system 16, a movement system 18, and a holding fixture 40 (see FIG. 2). The controller 12 preferably comprises a computer. However, the controller 12 could comprise any suitable type of component or components.

The input optical system 14 is operably connected to the controller 12. The input optical system 14 preferably comprises a source of optical energy, such as a laser, and an optical energy emitter, such as an optical fiber and collimator assembly. However, any suitable type of input optical system could be provided. Referring also to FIG. 2, the input optical system 14 includes an optical fiber 20 and a collimator 22. The optical fiber 20 is connected to the source of optical energy. In an alternate embodiment, the optical fiber 20 and fiber collimator 22 could be replaced by any suitable type of optical energy delivery system. In an alternate embodiment, the input optical system 14 could comprise more than one optical fiber 20, more than one collimator 22, and/or more than one source of optical energy.

The detector system 16 is operably connected to the controller 12. Referring also to FIG. 2, the detector system 16 preferably comprises a single optical detector 24, such as a InGaAs remote detector. For example, the optical detector 24 could comprise an Agilent model 81624A detector having a 5 mm diameter clear aperture. However, any suitable type of optical detector could be provided. In an alternate embodiment, the detector system 16 could comprise more than one optical detector.

Figure 3:
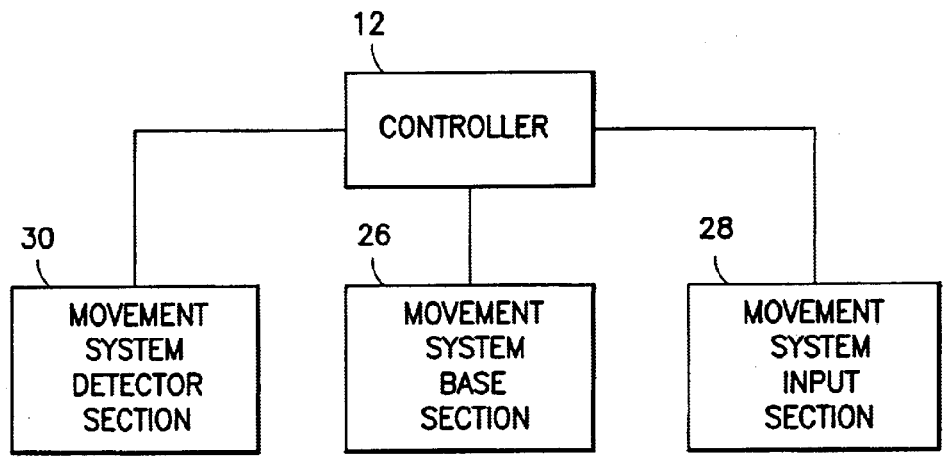
FIG. 3 is a block diagram showing the movers shown in FIG. 2 connected to the controller shown in FIG. 1.
Figure 4:
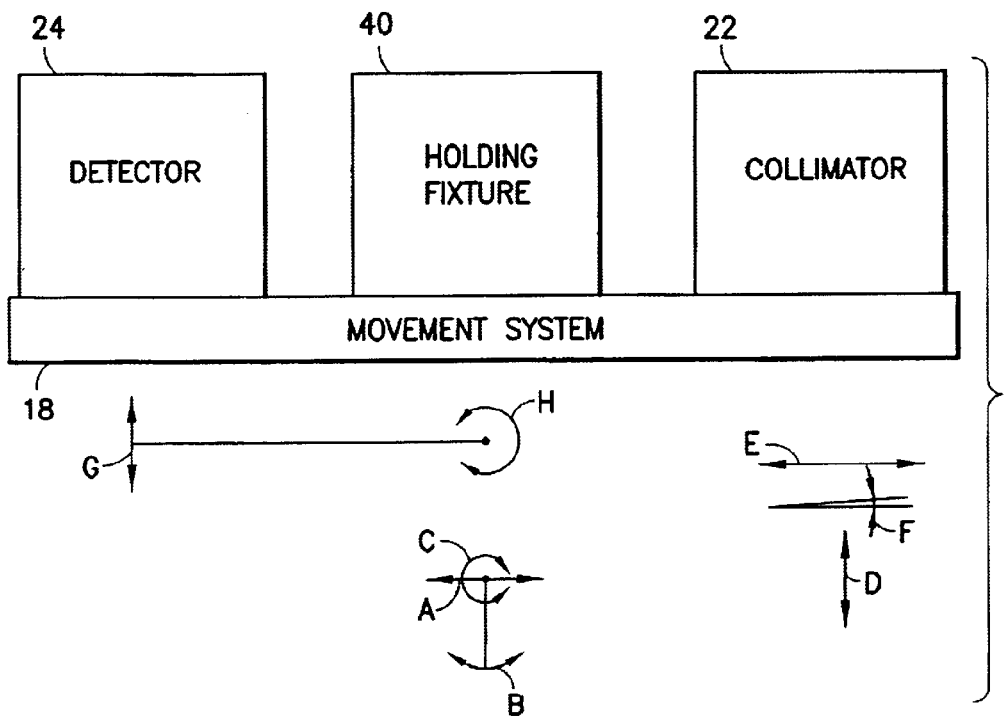
FIG. 4 is a block diagram illustrating different types of movements of the components shown in FIG. 2.

The movement system 18 is operably connected to the controller 12. Referring also to FIGS. 2–4, the movement system 18 generally comprises a base section 26, an input section 28, and a detector section 30. The movement system 18 connects the collimator 22, detector 24 and holding fixture 40 to each other. The movement system 18 allows these three components 22, 24 and 40 to be moved relative to each other.

The base section 26 includes three holding fixture movers 32, 34, 36. In alternate embodiments, the base section 26 could comprise more or less than three holding fixture movers. The base section 26 also includes a mount (not shown for the sake of clarity) for removably connecting the holding fixture 40 to the first mover 32. The mount (not shown) is connected to the top of the first mover 32.

The first mover 32 generally comprises a translation drive for providing horizontal motion of the holding fixture 40 as indicated by arrow A. The first mover 32 is used to choose the filter column in the holding fixture 40 to be measured. The second mover 34 comprises an elevation drive for providing pivoting motion of the holding fixture 40 as indicated by arrow B in FIG. 4. The axis of rotation for the second mover 34 preferably intersects the vertical axis and the collimated beam axis and is centered on the array middle row of the holding fixture 40. The second mover 34 is used to obtain an initial alignment condition for each filter of the array. The third mover 36 is a rotational drive and, in the embodiment shown, is an inner rotation motion control. The third mover 36 rotates the first and second movers 32, 34 and the holding fixture 40 as indicated by arrow C to achieve an initial condition of the holding fixture followed by incidence angle selection. The vertical axis of rotation preferably passes through the thickness of the holding fixture 40 and can be centered on the array of the holding fixture when it is centered on the collimated beam.

Together with the vertical movers of the collimator 22 and detector 24, the three motion control axis of the movements A, B and C serve to scan the array of filters in the holding fixture 40 past the stationary incident optical beam as well as keep the beam centered on the filter aperture during swings to non-zero incidence angles. In an alternate embodiment, any suitable type of base section and associated movers could be provided to move the holding fixture 40. Alternatively, one or more axis of movement provided in the base section 26 could be relocated into one or both of the movement system detector section 30 or movement system input section 28.

The movement system input section 28 generally comprises three movers 42, 44, and 46. In this embodiment, the three movers 42, 44, and 46 are connected to each other in series. In an alternate embodiment, the movement system input section 28 could comprise more or less than three movers. The movement system input section 28 generally comprises a mounting arm 50. The mounting arm 50 is adapted to have the fiber collimator 22 fixedly mounted thereon. Mounting of the fiber collimator 22 to the arm 50 allows control of the bend radius of the fiber 20. In a preferred embodiment, this can provided access to a reflected beam included angle of greater than one degree; the minimum angle of incidence then being about 0.5 degrees with the collimator distance set to about 80 mm and the beam size being about 1 mm in diameter.

The first mover 42 is connected to the mounting arm 50. The first mover 42 comprises a vertical motion drive for moving the mounting arm 50 and fiber collimator 22 vertically up and down as indicated by arrow D. The first mover 42 is connected to the second mover 44 by an adapter 52.

The second mover 44, in the embodiment shown, comprises a manual adjustment translation stage. However, in alternate embodiments, the manual adjustment translation stage might not be provided. In an alternate embodiment, the adjustment translation stage might not be manual, but could be automatic or computer-controlled. The second mover 44 comprises a rotatable adjustment knob 54 which can be rotated by a user. The second mover 44 is adapted to provide translational movement as indicated by arrow E. The second mover 44 is connected to the third mover 46 directly above the third mover. The manual adjustment translation stage 44 is used for initial alignment of the collimator beam to a central vertical axis.

The third mover 46, in the embodiment shown, comprises a manual tilt adjustment stage. However, in alternate embodiments, the manual tilt adjustment stage might not be provided. In an alternate embodiment, the manual tilt adjustment stage might not be manual, but could be automatic or computer controlled. The third mover 46 comprises a rotatable adjustment knob 56 which can be rotated by a user to tilt the arm 50 and the first and second movers 42, 44 at pivot axis 58 as indicated by arrow F. The manual tilt adjustment stage 46 is used for initial alignment of the collimator beam to the central vertical axis. The third mover 46 is connected to the base section 26 by a stationary support 60. The stationary support 60 is used to set the distance from the collimator 22 to the filter array in the holding fixture 40 in order to define a beam aperture at the filter being tested which depends upon the choice of the collimator and the beam waist versus the distance calibration information.

The movement system detector section 30 generally comprises two movers 62 and 64. In an alternate embodiment, the movement system detector section 30 could comprise more or less than two movers. In the embodiment shown, the two movers 62 and 64 are connected in series by an adapter section 66. The first mover 62 is a vertical motion stage for the detector 24. The first mover 62 provides vertical motion as indicated by arrow G to allow alignment of the detector 24 to alternate rows of the filter array in the holding fixture 40.

The second mover 64 comprises an outer rotational motion stage. The second mover 64 is adapted to rotate the adapter section 66, the first mover 62 and the detector 24 as indicated by arrow H. In the embodiment shown, the second mover 64 is adapted to swing the detector 24 around the central vertical axis; aligned coaxially with the rotational motion of the inner rotational motion stage 36 of the movement system base section 26.

The second mover 64 is adapted to rotate the detector 24 about 180 degrees between a position facing the rear side of the holding fixture 40 (as shown in FIG. 2) and a position facing the front side of the holding fixture in a position proximate the collimator 22. In a preferred embodiment, when the detector 24 is located proximate the collimator 22, the detector 24 and collimator 22 are angled relative to each other at about two degrees apart measured from an apex at the filter being tested. However, in alternate embodiments, the angle of rotation provided by the second mover 64 could be any suitable angle, and the spacing between the detector and the collimator could be any suitable type of spacing.

In an alternate embodiment, the testing unit could be provided with multiple collimators and/or multiple detectors, such as for testing more than one filter at a time in the same testing unit. In another alternate embodiment, the testing unit could be adapted to rotate the holding fixture 180 degrees about the vertical axis and the collimator 22 could be rotated with it to the same side as the detector.

Referring now to FIGS. 5–8, one embodiment of the holding fixture 40 will be described. In alternate embodiments, other types of holding fixtures could be used. The holding fixture 40 is generally adapted to hold a plurality of optical components, such as optical filters (diced filters for example). However, in alternate embodiments, the holding fixture 40 could be adapted to hold any suitable type of optical component for testing. The holding fixture 40, in the embodiment shown, generally comprises a frame 70 and spacers 72. The frame 70 generally comprises a first frame member 74 and a second nested frame member 76. In alternate embodiments, the frame could comprise more or less than two frame members, and the frame members might not be nested the first and second frame members 74, 76 are preferably comprised of steel. However, in alternate embodiments, any suitable type of material(s) could be used. As shown best in FIG. 8, the first frame member 74 is suitably sized and shaped to be inserted or nested into a receiving area 78 of the second frame member 76.

The first frame member 74 generally comprises a front surface 80, an array of through-holes 82, and a pocket 84. The front surface 80 is preferably lapped flat. This creates a surface of the tool contacted by the filters which is lapped flat to minimize relative filter tilts and, hence, the duration of search routine initialization. The first frame member 74 is suitably sized and shaped to make a mating connection with the second frame member 76 in the receiving area 78. In the embodiment shown, the array of through-holes 82 comprises a seven-by-seven array of the through-holes to create forty-nine receiving areas for receiving forty-nine optical filters. In an alternate embodiment, the first frame member could comprise any suitable number of through-holes and the through-holes could be aligned in any suitable type of array.

The first frame member 74 comprises a window 86 connected thereto. The window 86 is preferably a transparent glass window with an anti-reflection coating thereon. The anti-reflection coating is preferably matched for the bandwidth of the filters being tested. In a preferred embodiment, the window 86 is connected to the first frame member 74 at an inclined angle. The window is preferably mounted at an angle greater than the expected range of measured reflection angles (currently in the range of about 0.5 degrees to about 4 degrees relative to the angle of incidence). The window 86 is connected at the pocket 84 to form a vacuum chamber area 88. The through-holes 82 extend into the vacuum chamber area 88. Secondary reflections can be directed beyond the field of the detector. Because of the presence of the vacuum window, the transmitted and reflected 0 dB power set up of the detector can be compensated to account for this presence. The beam waist of the collimated beam can be chosen to be less than the clear aperture of each of the through-holes in the holding fixture array.

The through-holes 82 are preferably suitably sized and shaped to receive a first section of the optical filters therein. A second larger section of the optical filters are adapted to be placed against the lapped surface 80 and seated thereagainst. The first frame member 74 also comprises a hole 90 extending from the vacuum chamber area 88 to an area 92. A vacuum hose attachment 94 is fixedly mounted to the first frame member 74 at the area 92 and is operably connected to the hole 90. A source of vacuum can be connected to the vacuum hose attachment 94 to create a vacuum or reduced pressure in the vacuum chamber area 88.

With the optical filters located in the through-holes 82, the vacuum pressure in the vacuum chamber area 88 creates a vacuum holding of the optical filters on the first frame member 74. In an alternate embodiment, any suitable type of configuration could be used to provide vacuum holding for the optical filters in the holding fixture. In an alternate embodiment, the holding fixture could comprise any suitable type of holding system including a system which does not use vacuum holding.

The second frame member 76 comprises a general loop shape with a center aperture forming the receiving area 78. The front side 96 of the second frame member 76 comprises a raised ring section 98 surrounding the center aperture.

In the embodiment shown, the raised ring section 98 has a general square shape with slots 100 therethrough. In an alternate embodiment, the raised section 98 could comprise any suitable type of shape and the slots 100 could be replaced by through-holes. Located outward from the raised section 98 are four pocket areas 102. The second frame member 76 comprises posts 104 located in the pocket areas 102.

The spacers 72 are comprised of flexible line shaped members. In an alternate embodiment, the spacers might not be flexible. In the embodiment shown, the holding fixture 40 comprises two spacers 72. In an alternate embodiment, more or less than two spacers could be provided. In a preferred embodiment, the spacers 72 comprise a metal wire or plastic filament line. However, in alternate embodiments, the spacers could be comprised of any suitable type of material(s).

The spacers 72 have opposite ends which are connected to mounting posts 104a of the posts 104. The spacers 72 extend through the slots 100 and are wrapped around posts 104b of the posts 104. The posts 104b allow the spacers 72 to be redirected 180 degrees. The slots 100 provide spacing between adjacent portions of the spacers 72. The spacers are located above the holes 82 at a preferred height of about one half the filter thickness and, are aligned such that each filament section bisects the X-Y distance between centerlines of the holes 82. In a preferred embodiment, the spacing between the portions of the spacers 72 in the center aperture is slightly less than the size of the optical filters.

Figure 5:
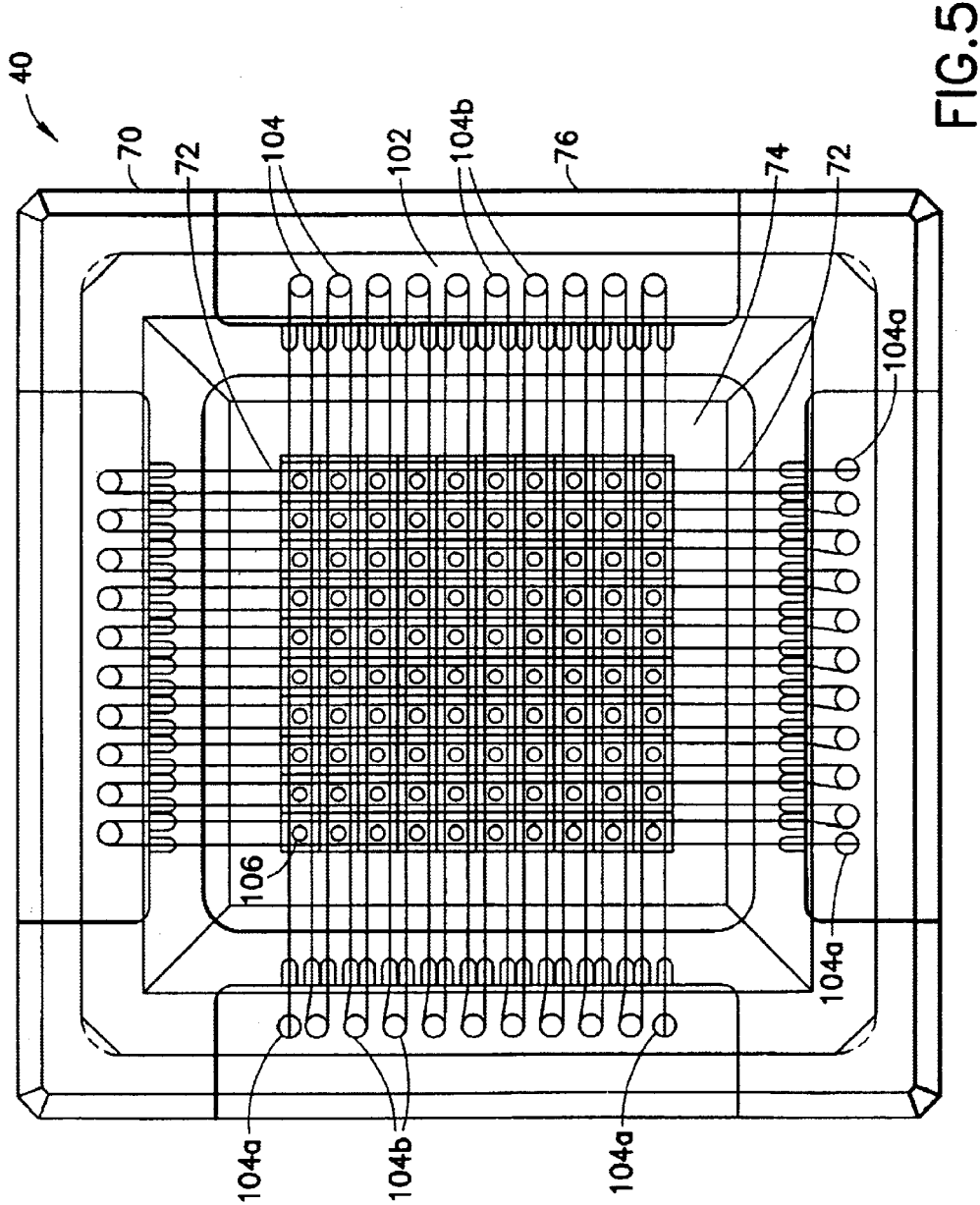
FIG. 5 is a front elevational view of the holding fixture shown in FIG. 2.
Figure 6:
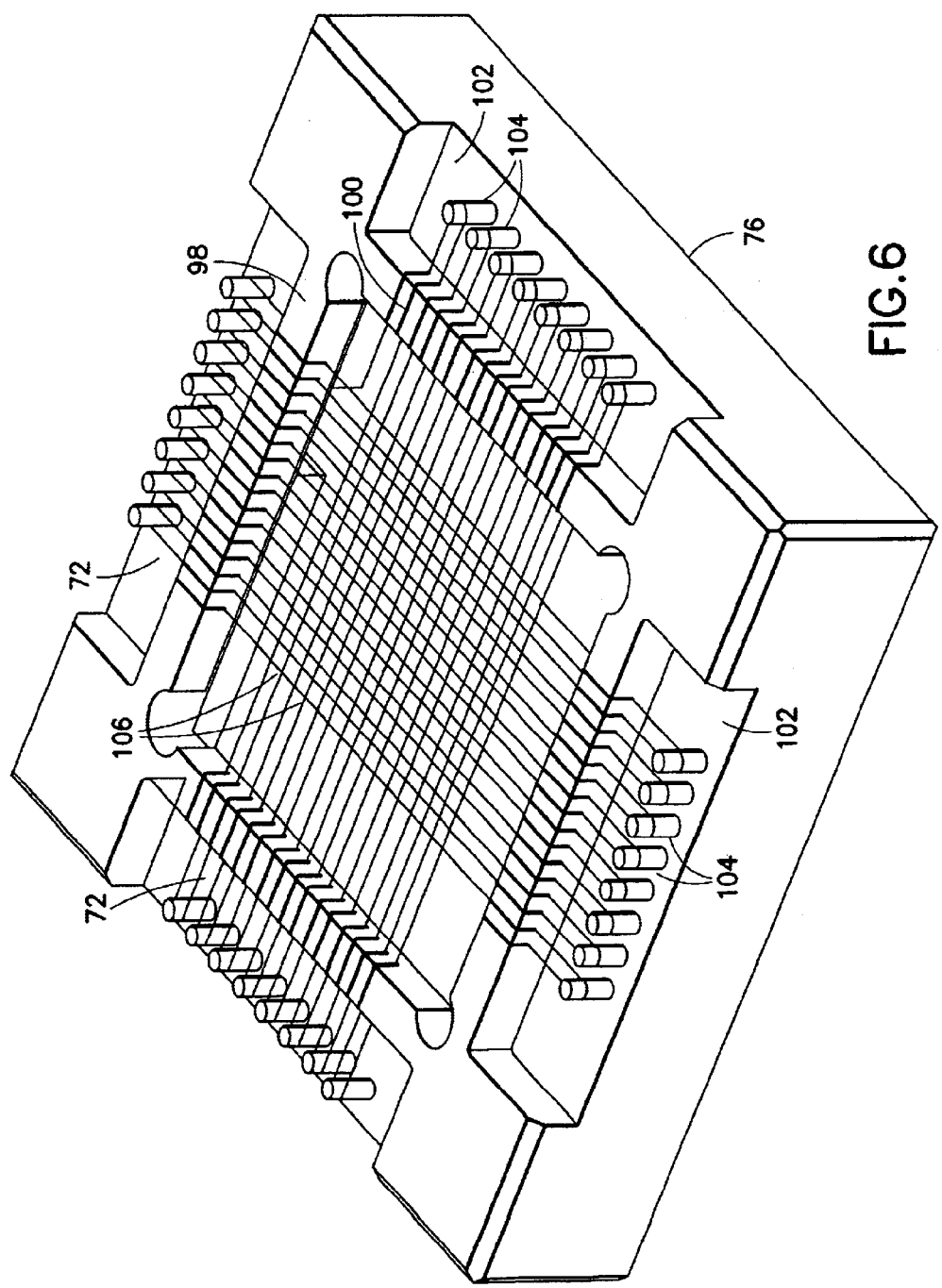
FIG. 6 is a perspective view of one of the components of the holding fixture shown in FIG. 5.
Figure 7:
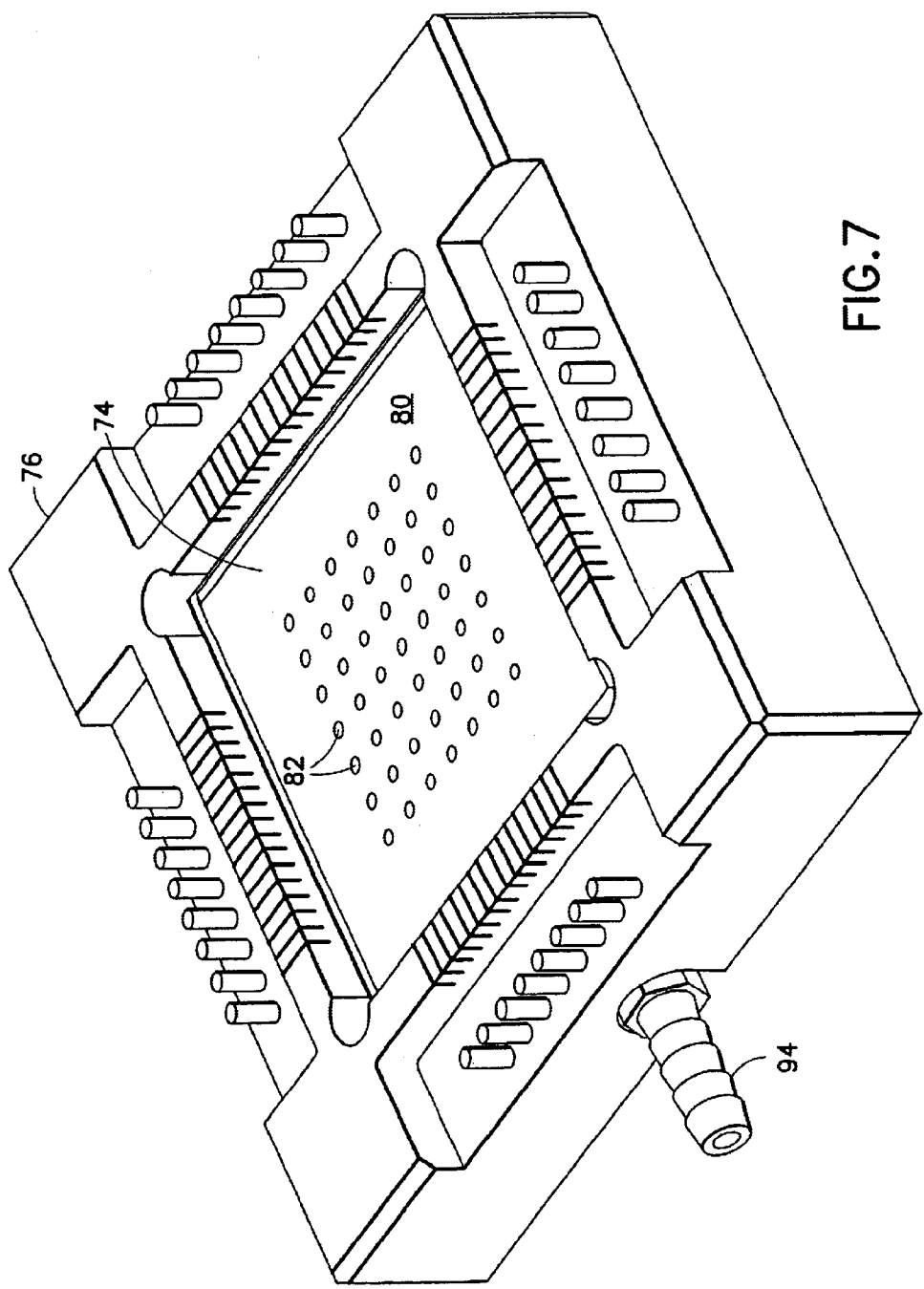
FIG. 7 is a perspective view of the holding fixture shown in FIG. 5 with the flexible line shaped spacers remove for clarity.
Figure 8:
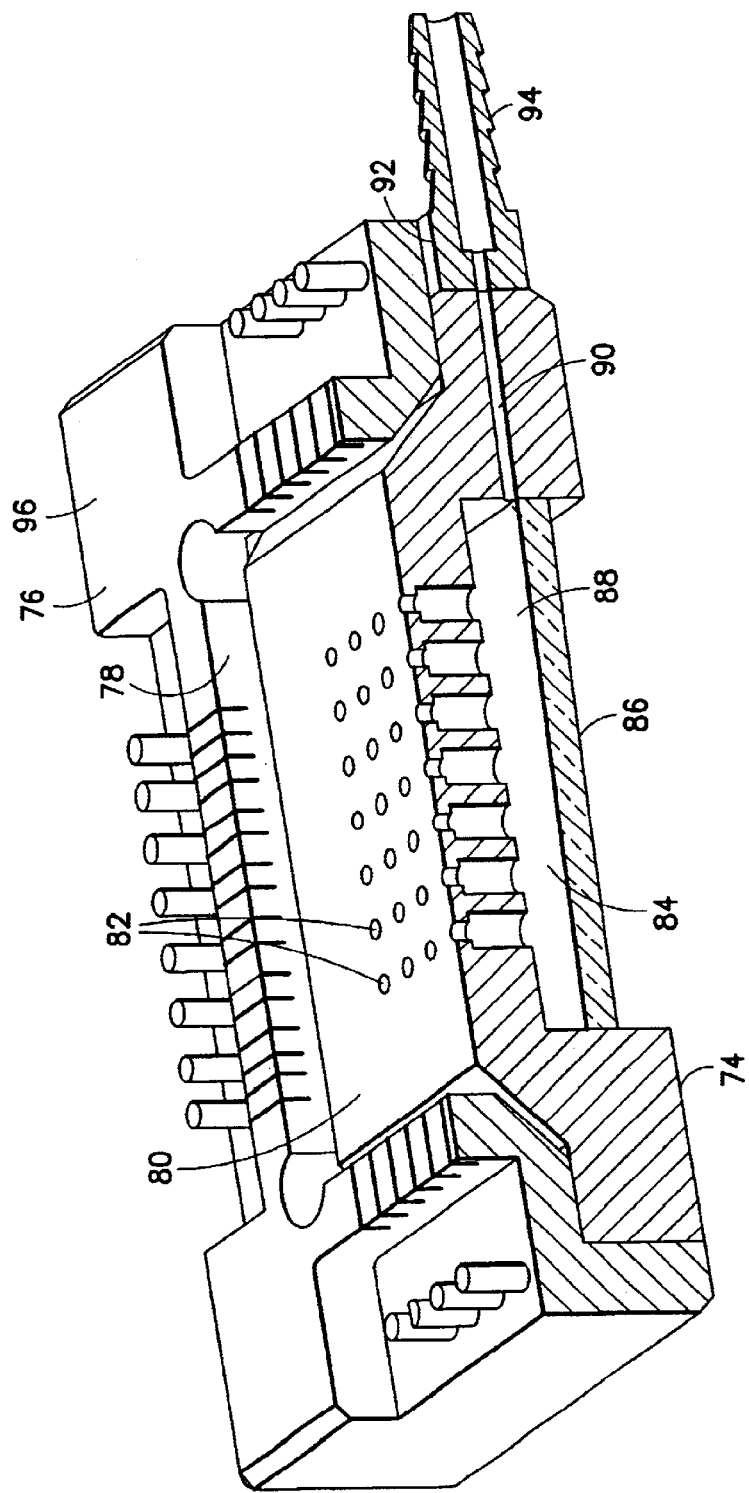
FIG. 8 is a perspective cutaway view of the holding fixture shown in FIG. 7.

The spacers 72 rap back and forth between the opposing posts 104 to form the crisscrossing shape as shown best in FIGS. 5 and 6. The crisscrossing shape forms receiving areas 106 for receiving the second relatively larger portions of the optical filters. The spacers 72 provide a course positioning system for the optical filters when the filters are initially positioned into the holding fixture 40. In an alternate embodiment, the spacers 72 might not be provided. In an alternate embodiment, any suitable type of course positioning system could be provided.

The optical filters are each inserted between four adjacent filament sections and into one of the holes 82. The filaments sections flex during the insertion process to forgive course position errors. Once suspended between the filaments, the tension provided in the filament serves to automatically aligned the mounted filters to be centered above their respective holes 82. A vacuum load is then applied to locate and stationarily fix all the filters in position on the holding fixture for subsequent alignment and testing cycles on the movement system base section 26. In an alternate embodiment, the holding fixture 40 could be used other than with the unit shown in FIG. 2, such as any suitable type of optical component testing unit.

Figure 9B:
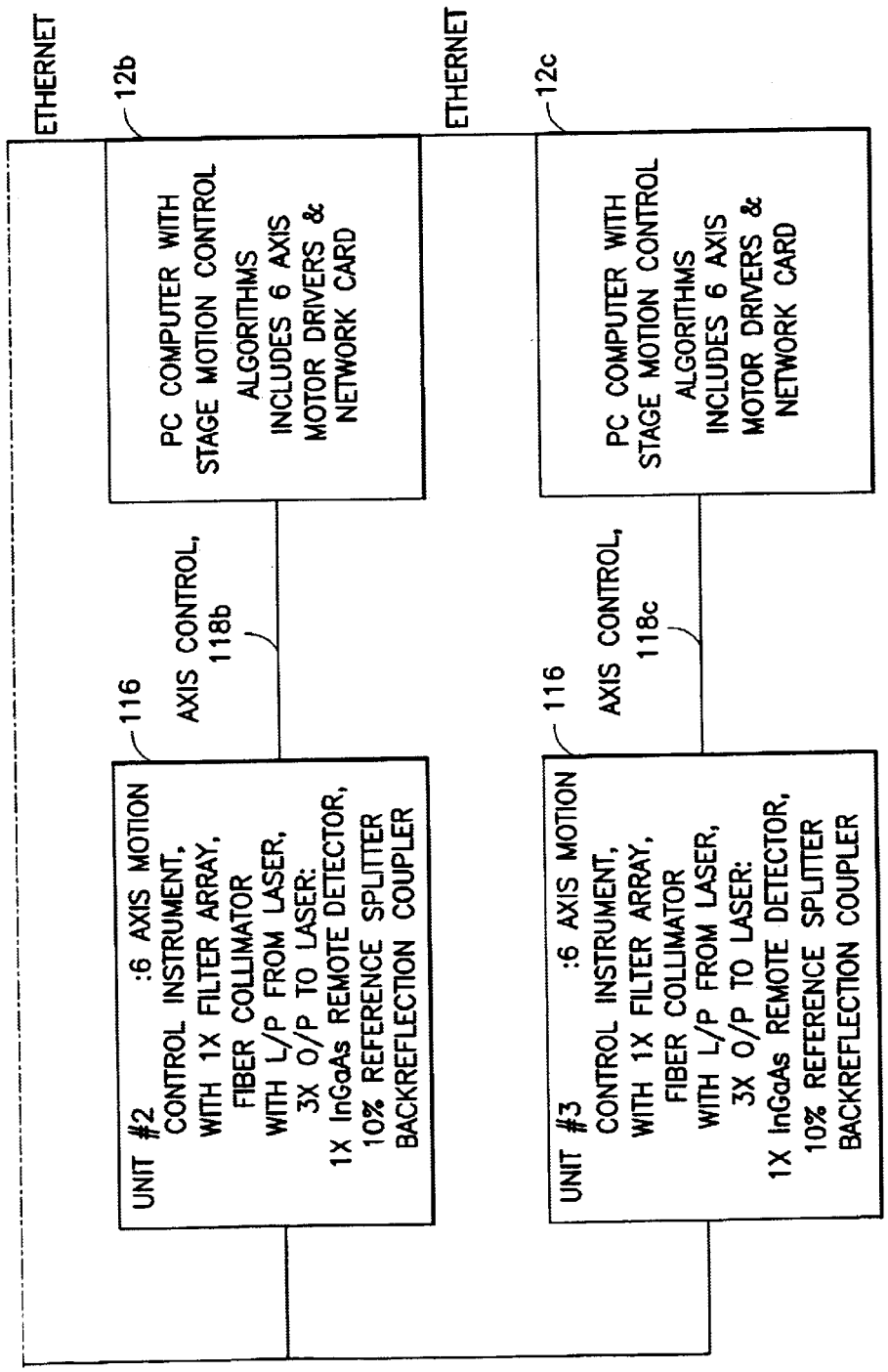
FIG. 9 is a block diagram of a system incorporating features of the present invention.

Referring now also to FIG. 9, a scaled embodiment of the present invention will be described. FIG. 9 is a block diagram of an electronic and computer interface showing use of systems similar to the system shown in FIGS. 1 and 2 scaled to include three holding fixture movement and testing units. The system 110 generally comprises a first controller 12, three second controllers 12a, 12b and 12c, an energy source 112, detector and fiber circuits 114, and three units 116. The three units 116 are substantially identical to the unit shown in FIG. 2. However, in alternate embodiments, the three units 116 could be different from each other. In addition, more or less than three units could be provided. In an alternate embodiment, the units 116 could also be different from the unit shown in FIG. 2.

In the embodiment shown, the first controller 12 comprises a personal computer (PC), such as having a 400 MHz Pentium 3 processor, a display and a keyboard. However, the first controller 12 could comprise any suitable type of processor, and input and output devices. The controller 12 also preferably comprises a network hub and a laser scan trigger control. The first controller 12 is preferably connected to the second controllers 12a, 12b, 12c by an Ethernet connection. However, in alternate embodiments, any suitable type of system for networking the computers together could be provided.

The second controllers 12a, 12b, 12c each preferably comprised a PC computer with stage motion control algorithms and include six axis motor drivers and a network card. However, in alternate embodiments, any suitable type of second controllers could be provided. Each of the second controllers 12a, 12b, 12c is individually connected to one of the units 116 by an axis control 118a, 118b, 118c. In an alternate embodiment, one of the second controllers could control more than one of the units 116. In another alternate embodiment, the second controllers could be eliminated and the first controller 12 could control the units 116.

The laser 112 is preferably a tunable laser with a robotic interface and a multiple power sensor interface, such as an Agilent interface model number 8164A or 81640A or 81619 for example. However, any suitable type of interfaces could be provided. In the embodiment shown, the robotic interface is a GPIB interface. However, any suitable type of robotic interface could be provided. The laser 112 is connected to the main controller 12 by connection 120.

The detector and fiber circuits 114 connect the tunable laser to the three units 116. Each unit 116 generally comprises a six axis motion control instrument, a holding fixture for the filter array, a fiber collimator with an input from the laser 112, and three outputs. The three outputs preferably comprise the InGaAs remote detector, a 10% reference splitter, and a back-reflection coupler. However, in alternate embodiments, the units 116 could comprise any type of alternate or additional components.

Separate PCs can control independent motion search algorithms which align filters using a merit function derived from the back-reflection fiber splitter's output. The units can operate in parallel and can be paced by the laser scan trigger which can alternate between a fixed wavelength align mode and a scanned wavelength measure mode. An asynchronous trigger may also be used.

The present invention can comprise an instrument to facilitate the rapid measurement of optical transmission and reflection of optical components, such as diced filters commonly used in telecommunications applications for beamsplitters, multiplexers, de-multiplexers, add-drop modules, etc. The invention can be configured to measure any type of passive diced filter within the bandwidth of the accessory light source and detector; which can be commercially available components. The present invention can address the problem of sorting filters for specific parameters such as bandwidth, insertion loss, residual in-band propagation, etc. as is required when delivering filters in volume quantities in support of Telecom device production. The present invention can characterize a filter's performance in both transmission and reflection when the filter is illuminated by a single beam of light from a typical fiber collimator which can be chosen by the user.

The present invention can use two tools to facilitate measurement; a holding fixture and a motion control system. The holding fixture can comprise a vacuum operated holding fixture design to hold an array of filters. In a preferred embodiment, the holding fixture can hold a 7×7 array of 2 mm square filters equaling a total capacity of 49 filters. The array can be held parallel to a vertical axis of the instrument, allowing a collimated beam of light to pass horizontally through each of the filters.

The motion control system is preferably a six axis system used to effect mechanical positioning of the filters relative to the input fiber collimator and relative to the detector. The detector position can be varied to obtain either reflection or transmission measurements over a detector field sweeping around the filter in a plane; such as a horizontal plane. The entire transmission and reflection measurements operation can be automatically controlled for all filters in an array, including the initialization of incidence angle and 0 dB power levels. The equipment is scalable in the sense that more than one array and motion control system can be interfaced to a single tunable laser source with integrated detector interface. In one embodiment, the device can be built with four arrays allowing 196 filters to be loaded and measured in one measurement cycle.

The vacuum filter array tool allows easy handling of filters, clean preparation, and permits the filters to be held in a vertical array during measurement which leads to convenient use of multi-axis motion control movements. The motion control of the filter inclination relative to the collimator allows individual initialization of an incidence angle for each filter of the array. This preserves position of the measured wavelength without the need for extreme accuracy in the loading of the array. The device can therefore measure filters within specifications typical of Telecom devices having a bandwidth of 50 gigahertz or less over a range of incidence angles and reflection angles. The motion control and disposition of the detector revolving around the filter allows transmission and reflection measurements to be done with one calibrated detector which can be initialized at 0 decibels without the need for reflectance gauges to set power levels when the detector is in position to intercept reflected energy. The distance of the detector to the sample can be preserved for both types of measurements.

Diced filters are generally used in optical networking. Diced filters are highly sensitive to angle and position and require extremely precise internal conditions. Recent applications of diced filters can be found in the 50 gigahertz bandpass, and 100 gigahertz bandpass diced filters are envisioned. Diced filters can be extremely small, such as having sections which are only 1 mm and 1½ mm square, and an aperturance which is substantially non-uniform across. Thus, testing of diced filters requires great precision. The present invention significantly reduces the time it takes to test diced filters and, can be used for testing other optical components as well.

The filters in the holding fixture are preferably tested one at a time. The movement system 18 moves the detector 24, holding fixture 40 and collimator 22 to a start position relative to each other. The position of the collimator 22, detector 24 and holding fixture 40 is then adjusted during an initialization process to seek a substantially perfect normal incidence angle relative to the first filter being tested. A return signal feedback through the collimator is preferably used for this initialization/seek process. The detector 24 then takes transmission measurements of the energy transmitted through the filter being tested while the detector is at the rear side of the holding fixture 40. The movement system detector section 30 then moves the detector 24 to the front side of the holding fixture 40 to take reflection measurements.

When testing of the first filter is completed, the movement system detector section 30 moves the detector 24 back to the rear side of the holding fixture. The movement system 18 can then vertically move the detector 24 and collimator 22 and/or horizontally move the holding fixture 40 into general alignment with another filter to be tested. The normal incidence initialization/seek process and the testing process are then repeated for the new filter being tested. When all the filters in the holding fixture have been tested, the holding fixture can be removed and the test results can be used to categorize and separate the tested filters. In alternate embodiments, variations of the method steps described above could be performed while still practicing features of the present invention.

It should be understood that the foregoing description is only illustration of the invention. Various alternatives and modification can be devised by those skilled in the art without departing from the invention. Accordingly, the present invention is, intended to embrace all such alternatives, modifications and variances which fall within the scope of the appended claims.

What is claimed is:

1. An optical component measurement system comprising:
    a holding fixture adapted to hold a plurality of optical components in an array; and
    an optical detector movably connected to the holding fixture, wherein the detector is movable between a front side of the holding fixture and an opposite rear side of the holding fixture for taking measurements from more than one side of the optical components in the array.

2. An optical component measurement system as in claim 1 further comprising a base section adapted to have the holding fixture connected thereto.

3. An optical component measurement system as in claim 2 wherein the base section comprises a mover for moving the holding fixture on the base section.

4. An optical component measurement system as in claim 3 wherein the mover is adapted to move the holding fixture in a first path of translation and adapted to rotate the holding fixture.

5. An optical component measurement system as in claim 4 wherein the mover is adapted to rotate the holding fixture along at least two axes of rotation.

6. An optical component measurement system as in claim 2 wherein the optical detector is rotatably connected to the base section.

7. An optical component measurement system as in claim 6 further comprising a vertical mover connected between the optical detector and the base section for vertically moving the optical detector relative to the holding fixture.

8. An optical component measurement system as in claim 2 further comprising an optical energy source emitter movably connected to the base section.

9. An optical component measurement system as in claim 8 wherein the optical energy source emitter is rotatably connected to the base section.

10. An optical component measurement system as in claim 9 further comprising a vertical mover for vertically moving the energy source emitter relative to the holding fixture.

11. An optical component measurement system as in claim 8 wherein the optical energy source emitter comprises a fiber collimator mounted into a mounting arm.

12. An optical component measurement system as in claim 1 wherein the holding fixture comprises:
    a frame comprising receiving areas sized and shaped to receive portions of optical components in the array; and
    crisscrossing flexible line shaped spacers located on the frame, the flexible line shaped spacers being adapted to be located between adjacent optical components located in the receiving areas to space the adjacent optical components from each other.

13. A method of measuring an optical filter comprising steps of:
    mounting the optical filter in a holding fixture, the holding fixture being adapted to hold an array of optical filters;
    connecting the holding fixture to a measuring device between an optical emitter and an optical detector or measuring device;
    measuring optical transmission through the optical filter; and
    moving the optical detector to an opposite side of the holding fixture to measure reflection of the optical filter.

14. A method as in claim 13 wherein the step of mounting the optical filter in a holding fixture comprises positioning a first portion of the optical filter in a hole of a frame, the hole being coupled to a vacuum chamber area.

15. A method as in claim 14 wherein the step of mounting the optical filter in a holding fixture comprises positioning a second portion of the optical filter adjacent flexible line shaped spacers located above the hole.

16. A method as in claim 13 further comprising vertical moving the optical detector relative to the holding fixture.

\* \* \* \* \*